(12) United States Patent
Zimmermann et al.

(10) Patent No.: US 10,668,542 B2
(45) Date of Patent: Jun. 2, 2020

(54) AUGER BIT WITH CARBIDE TIP

(71) Applicant: MILWAUKEE ELECTRIC TOOL CORPORATION, Brookfield, WI (US)

(72) Inventors: Michael J. Zimmermann, New Berlin, WI (US); Christopher T. Larson, Waukesha, WI (US); Todd S. Hahn, West Allis, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/126,499

(22) Filed: Sep. 10, 2018

(65) Prior Publication Data
US 2019/0076936 A1    Mar. 14, 2019

Related U.S. Application Data

(60) Provisional application No. 62/556,641, filed on Sep. 11, 2017.

(51) Int. Cl.
| | | |
|---|---|---|
| *B23B 51/00* | (2006.01) | |
| *B23B 51/02* | (2006.01) | |
| *B27G 15/00* | (2006.01) | |

(52) U.S. Cl.
CPC .......... *B23B 51/0009* (2013.01); *B23B 51/02* (2013.01); *B27G 15/00* (2013.01); *B23B 2226/27* (2013.01); *B23B 2251/14* (2013.01); *B23B 2251/50* (2013.01); *B23B 2251/60* (2013.01); *Y10T 408/03* (2015.01); *Y10T 408/901* (2015.01)

(58) Field of Classification Search
CPC ..... B27G 15/00; B23B 51/0009; B23B 51/02; Y10T 408/901
See application file for complete search history.

(56) References Cited

U.S. PATENT DOCUMENTS

| | | | | |
|---|---|---|---|---|
| 333,170 A | * | 12/1885 | Stearns | B27G 15/00 408/214 |
| 679,406 A | * | 7/1901 | Watson | B23B 51/02 408/211 |

(Continued)

FOREIGN PATENT DOCUMENTS

| | | | | |
|---|---|---|---|---|
| DE | 3626523 A1 | * | 2/1988 | B23B 51/02 |
| DE | 29722854 U1 | * | 4/1998 | |

(Continued)

*Primary Examiner* — Eric A. Gates
(74) *Attorney, Agent, or Firm* — Michael Best & Friedrich LLP

(57) ABSTRACT

An auger bit for cutting holes. The auger bit includes a body made of a first material. The body has a first end, a second end configured to be coupled to a power tool, a flute, and a longitudinal axis extending centrally through the body. The auger bit also includes a cutting tip made of a second material different from the first material. The cutting tip is coupled to the first end of the body. The cutting tip includes a first shoulder having a first spur, a first main cutting edge, and a first side cutting edge. The cutting tip also includes a second shoulder opposite the first shoulder and having a second spur, a second main cutting edge, and a second side cutting edge. The cutting tip further includes a center spur positioned between the first shoulder and the second shoulder and on the longitudinal axis.

16 Claims, 5 Drawing Sheets

(56) References Cited

U.S. PATENT DOCUMENTS

| | | | | |
|---|---|---|---|---|
| 2,543,206 | A * | 2/1951 | Smith | B27G 15/00 |
| | | | | 408/224 |
| 4,682,917 | A * | 7/1987 | Williams, III | B27G 15/00 |
| | | | | 408/212 |
| 5,228,812 | A * | 7/1993 | Noguchi | B23B 27/141 |
| | | | | 407/119 |
| 5,286,143 | A * | 2/1994 | Schimke | B27G 15/00 |
| | | | | 408/211 |
| 5,487,434 | A * | 1/1996 | Obermeier | B23B 51/02 |
| | | | | 175/323 |
| 6,676,341 | B1 * | 1/2004 | Lippincott | B23B 47/281 |
| | | | | 408/115 R |
| D507,585 | S * | 7/2005 | Held | D15/139 |
| 7,264,427 | B1 * | 9/2007 | Kunz-Mujica | B23B 49/005 |
| | | | | 408/202 |
| 2009/0269155 | A1 * | 10/2009 | Wang | B23B 31/008 |
| | | | | 408/211 |
| 2010/0247259 | A1 * | 9/2010 | Davidian | B23B 51/0009 |
| | | | | 408/228 |

FOREIGN PATENT DOCUMENTS

| | | | | |
|---|---|---|---|---|
| DE | 102008029404 A1 * | 12/2009 | | B23B 51/02 |
| EP | 1358979 A2 * | 11/2003 | | B23B 51/02 |
| FR | 2726782 A1 * | 5/1996 | | B27G 15/00 |
| JP | 2002-209316 A * | 7/2002 | | |
| WO | WO-2013166182 A1 * | 11/2013 | | |
| WO | WO-2015109485 A1 * | 7/2015 | | |

* cited by examiner

AUGER BIT WITH CARBIDE TIP

CROSS-REFERENCE TO RELATED APPLICATIONS

This application claims priority to U.S. Provisional Patent Application No. 62/556,641, filed on Sep. 11, 2017, the entire contents of which are incorporated herein by reference.

BACKGROUND

The present invention relates to auger bits and, in particular, to auger bits with carbide tips.

Auger bits are typically used with power tools, such as, for example, a drill, a driver drill, a screwdriver, and the like to cut or carve holes into a material or surface. Augers can be used to cut holes into a variety of materials, such as, for example, brick, block, tile, metal, marble, concrete, plaster, wood, plastic, dry-wall, and the like. Composite materials are also becoming more popular because of their lightweight and high strength. Utility poles are starting to be made out of composite materials such as fiberglass, fiber-reinforced polymer (FRP), and/or fiberglass resin. Typical augers can melt due to the heat generated when drilling into composite materials. To remedy this, augers are being made with carbide cutting tips. However, current carbide cutting tips leave unclean holes in the composite material.

SUMMARY

In one embodiment, the invention provides an auger bit for cutting holes in a composite material utility pole. The auger bit includes a body made of a first material. The body has a first end, a second end configured to be coupled to a power tool, a flute, and a longitudinal axis extending centrally through the body between the first and second ends. The auger bit also includes a cutting tip made of a second material different from the first material. The cutting tip is coupled to the first end of the body. The cutting tip includes a first shoulder having a first spur, a first main cutting edge, and a first side cutting edge. The cutting tip also includes a second shoulder opposite the first shoulder and having a second spur, a second main cutting edge, and a second side cutting edge. The cutting tip further includes a center spur positioned between the first shoulder and the second shoulder and on the longitudinal axis. The first and second spurs create a clean hole through the composite material utility pole.

In another embodiment, the invention provides a cutting tip for use with an auger bit for cutting holes in composite material utility poles. The cutting tip includes a front face, a back face opposite the front face, a lower surface extending between the front face and the back face, a first shoulder having a first spur, a first main cutting edge, and a first side cutting edge, a second shoulder opposite the first shoulder and having a second spur, a second main cutting edge, and a second side cutting edge, and a center spur positioned between the first shoulder and the second shoulder and on the longitudinal axis. The first and second spurs create a clean hole through the composite material utility pole.

In another embodiment the invention provides a method of cutting a hole in a composite material utility pole. The method includes providing an auger bit with a body made of a first material and having a first end, a second end configured to be coupled to a power tool, a flute, and a longitudinal axis extending centrally through the body between the first and second ends. The auger bit also includes a cutting tip made of a second material different from the first material and coupled to the first end of the body. The cutting tip includes a first shoulder having a first spur, a first main cutting edge, and a first side cutting edge. The cutting tip also includes a second shoulder opposite the first shoulder and having a second spur, a second main cutting edge, and a second side cutting edge. The cutting tip further includes a center spur positioned between the first shoulder and the second shoulder and on the longitudinal axis. The method also includes rotating the auger bit with a rotary tool and engaging the composite material utility pole with the auger bit to cut a clean hole.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
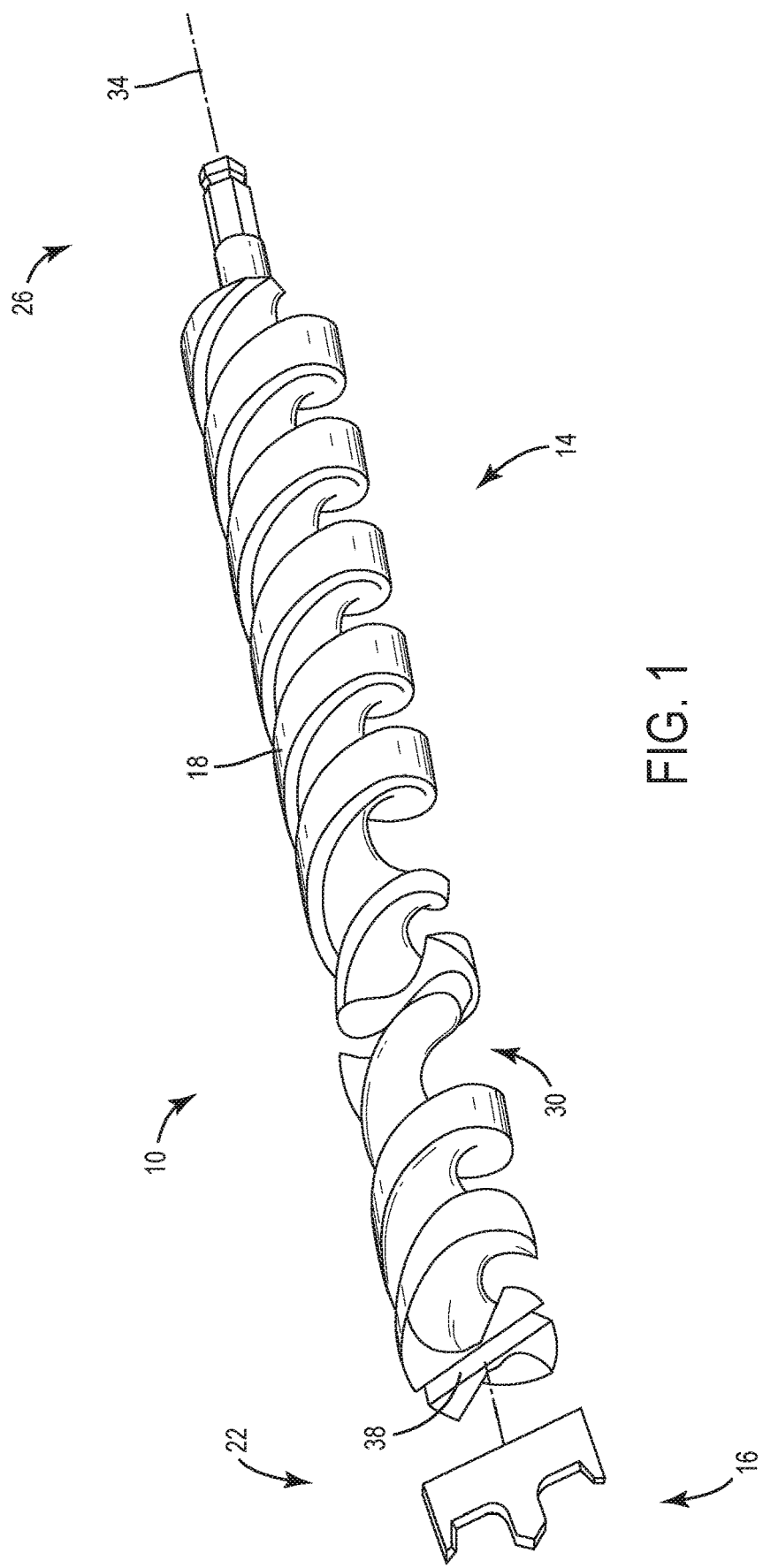
FIG. 1 is an exploded perspective view of an auger bit, the auger bit including an auger and a cutting tip.
Figure 2:
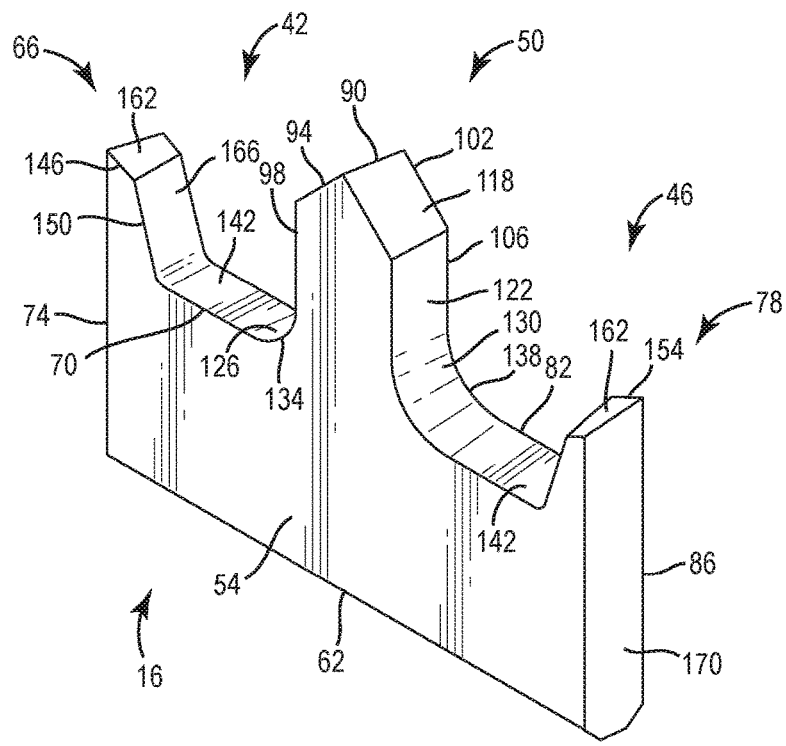
FIG. 2 is a perspective view of the cutting tip.
Figure 3:
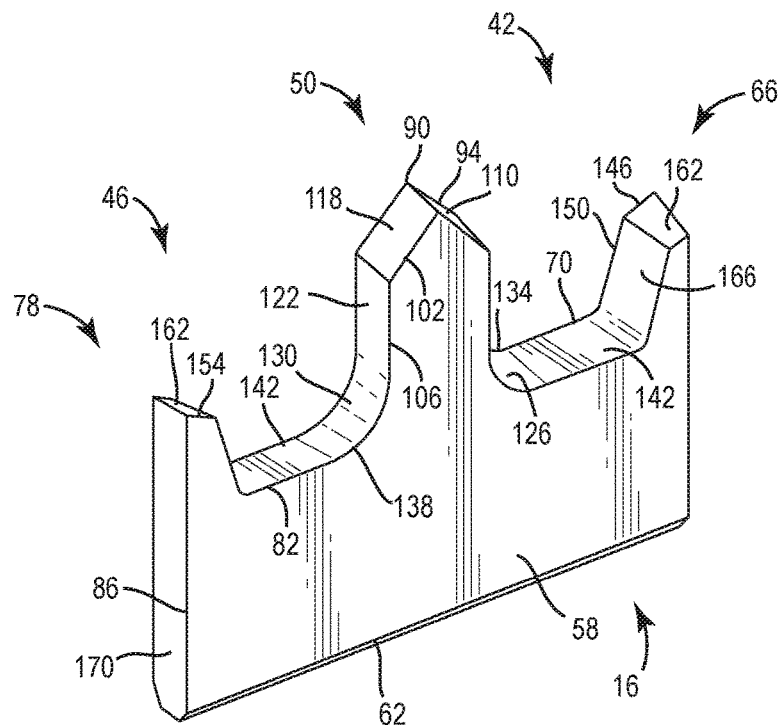
FIG. 3 is another perspective view of the cutting tip.
Figure 4:
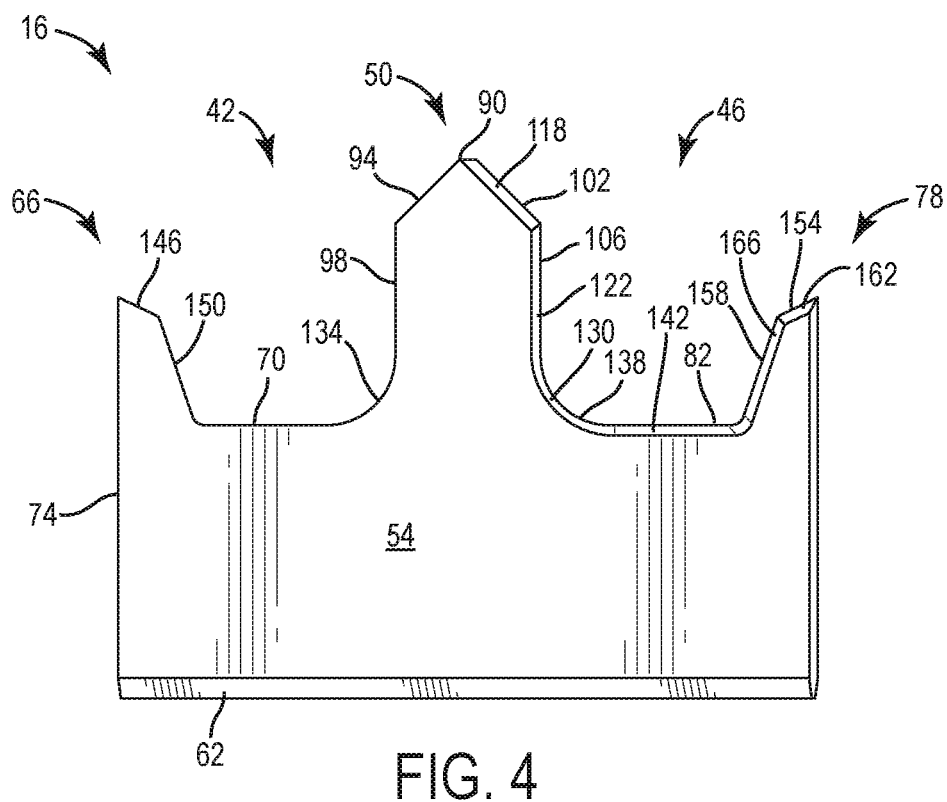
FIG. 4 is a front view of the cutting tip.
Figure 5:
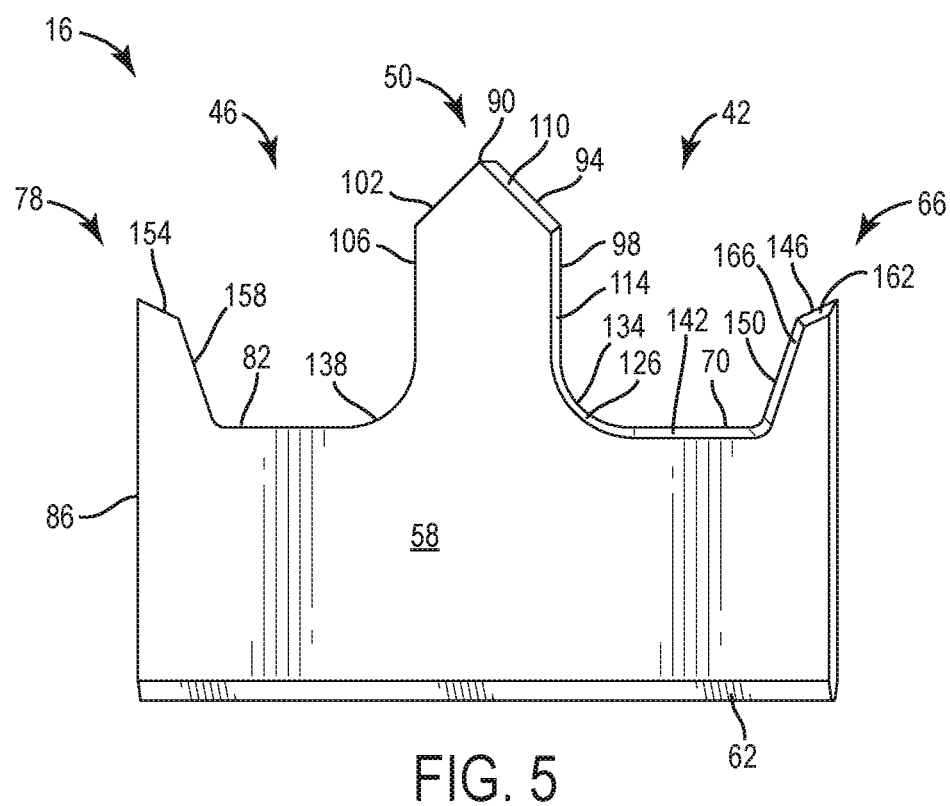
FIG. 5 is a back view of the cutting tip.
Figure 6:
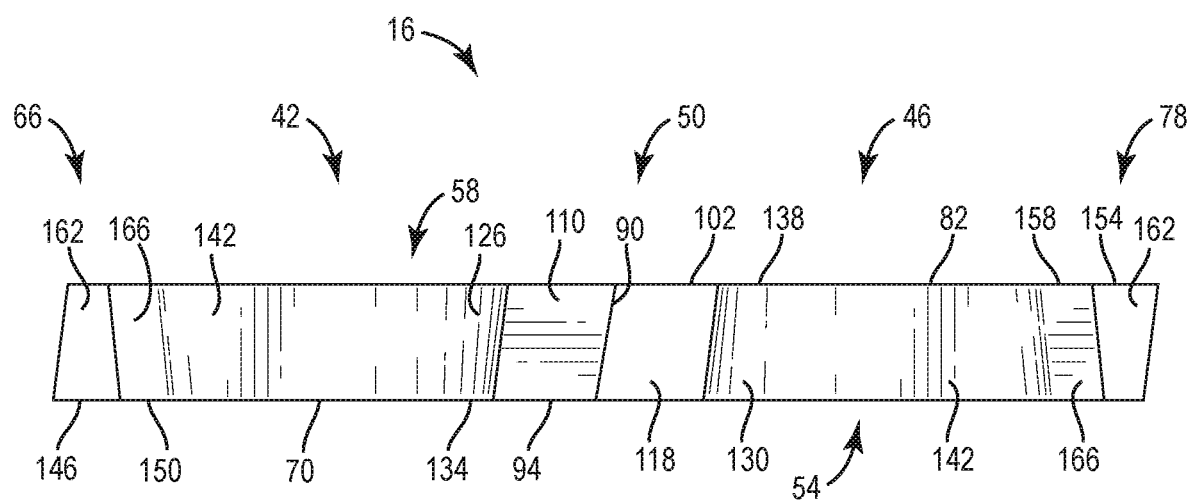
FIG. 6 is a top view of the cutting tip.
Figure 7:
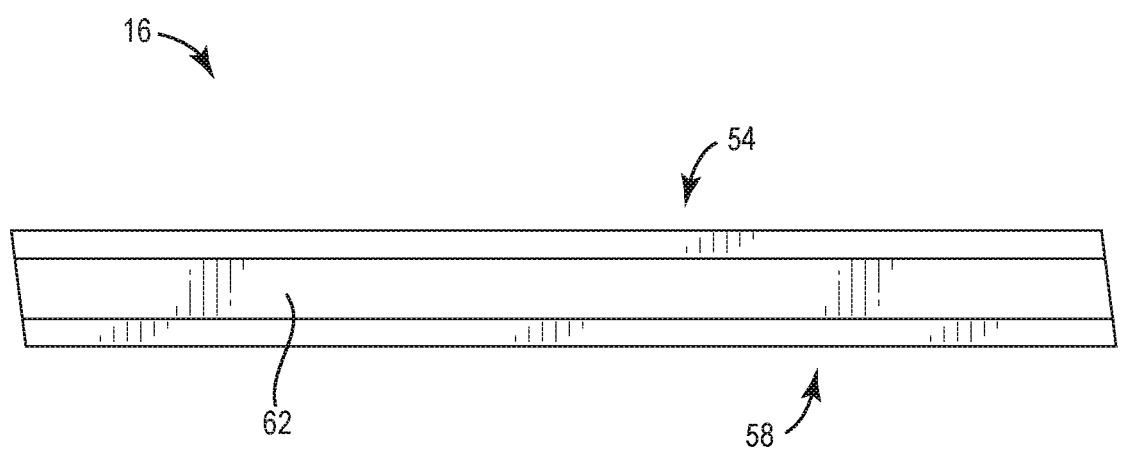
FIG. 7 is a bottom view of the cutting tip.
Figure 8:
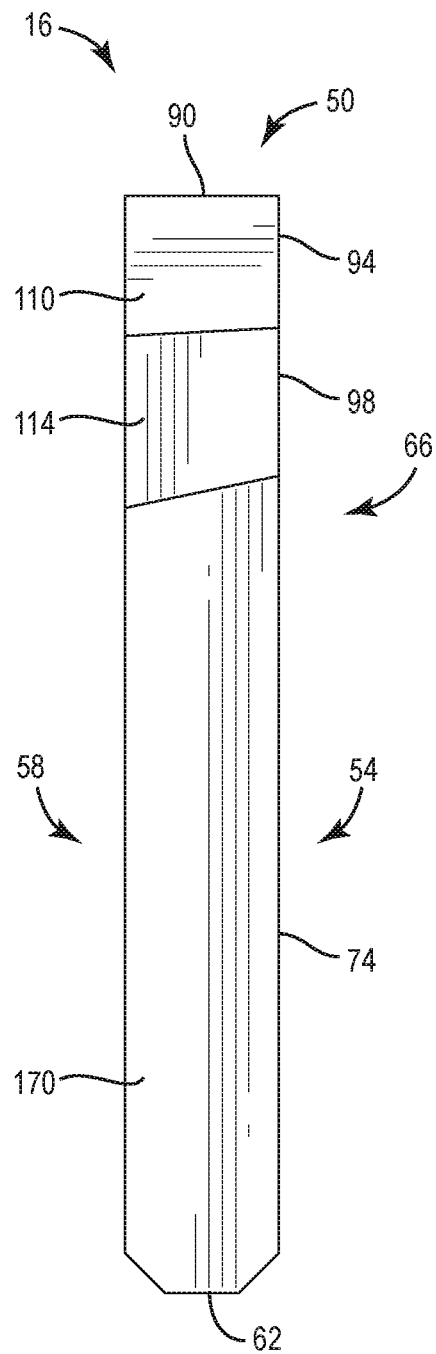
FIG. 8 is a first side view of the cutting tip.
Figure 9:
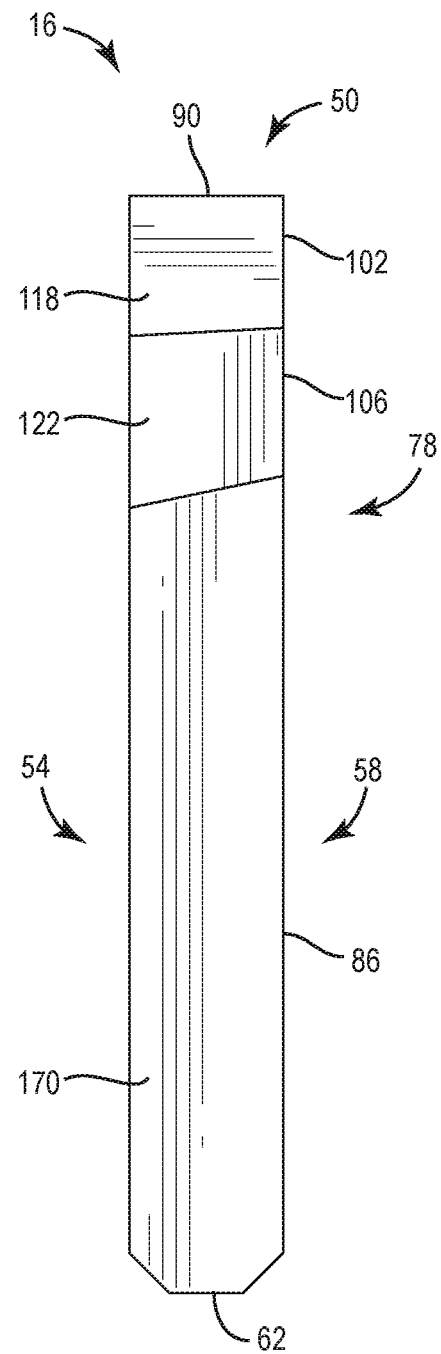
FIG. 9 is a second side view of the cutting tip.

FIG. 1 illustrates an auger bit 10 for use with a power tool, such as, for example, a drill, a driver drill, a screwdriver, and the like. The auger bit 10 includes a cutting tip 16 and a body 18 having a first or workpiece-engaging end 22, a second or rearward end 26 configured to be received in a tool holder or chuck of a power tool, and a flute 30. In the illustrated embodiment, the flute 30 extends the full length of the body 18. In other embodiments, the flute 30 may not extend the full length of the body 18. The second end 26 includes a hex-shaped shank or shaft that is configured to be coupled to the power tool. The body 18 also defines a longitudinal axis 34 extending through the first end 22 and the second end 26. The flute 30 extends in a helical manner about the longitudinal axis 34 along at least a portion of the body 18, from the first end 22 toward the second end 26. In the illustrated embodiment, the body 18 includes a single flute. In other embodiments, the body 18 may include multiple flutes. In further embodiments, the body 18 may not include a flute. In some embodiments, the body 18 may be made out of high speed steel. In other embodiments, the body 18 may be made of carbide. In further embodiments, the body 18 may be made of another material or combination of materials.

The cutting tip 16 is coupled to the body 18. In the illustrated embodiment, the cutting tip 16 is received in a slot 38 formed in the first end 22 of the body 18 and secured in place. In some embodiments, the cutting tip 16 may be braised, welded, or secured to the body 18 using other suitable means. The illustrated cutting tip 16 is formed of carbide. In other embodiments, the cutting tip 16 may be formed of high speed steel or any other suitable hard metals. In some embodiments, the cutting tip 16 may be composed of metal formed by a suitable process (e.g., casting, forging, molding, 3D printing, etc.). In further embodiments, the cutting tip 16 may be integral with the body 18.

As shown in FIGS. 2-9, the cutting tip 16 includes a first shoulder 42, a second shoulder 46, a center spur 50, a front face 54, a back face 58 opposite the front face 54, and a lower surface 62 extending between the front and back faces 54, 58. The lower surface 62 is received in the slot 38 of the body 18. The first shoulder 42 includes a first spur 66, a first main cutting edge 70, and a first side cutting edge 74. Similarly, the second shoulder 46 includes a second spur 78, a second main cutting edge 82, and a second side cutting edge 86. The first main cutting edge 70 and the first side cutting edge 74 are on the front face 54, while the second main cutting edge 82 and the second side cutting edge 86 are on the back face 58. The first and second shoulders 42, 46 extend in opposite radial directions from the center spur 50 in directions substantially perpendicular to the longitudinal axis 34 towards the spurs 66, 78 of the respective shoulders 42, 46. The side cutting edges 74, 86 extend axially from the spurs 66, 78 in a direction substantially parallel to the longitudinal axis 34.

The center spur 50 extends axially further than the spurs 66, 78 on the shoulders 42, 46 along the longitudinal axis 34. The illustrated center spur 50 includes an upper cutting tip 90 that extends between the front face 54 and the back face 58. The center spur 50 also includes two sets of cutting edges on opposing sides of the cutting tip 90. In other words, the center spur 50 has a first upper cutting edge 94 and a first lower cutting edge 98 on the front face 54 and a second upper cutting edge 102 and a second lower cutting edge 106 on the back face 58. Each cutting edge 94, 98, 102, 106 of the center spur 50 includes a relief surface. For example, the first upper cutting edge 94 includes a first upper cutting edge relief surface 110 extending from the front face 54 to the back face 58. The first lower cutting edge 98 includes a first lower cutting edge relief surface 114 extending from the front face 54 to the back face 58. The second upper cutting edge 102 includes a second upper cutting edge relief surface 118 extending from the back face 58 to the front face 54. The second lower cutting edge 106 includes a second lower cutting edge relief surface 122 extending from the back face 58 to the front face 54.

In the illustrated embodiment, the center spur 50 transitions to the first shoulder 42 by a first shoulder relief surface 126 and transitions to the second shoulder 46 by a second shoulder relief surface 130. The illustrated shoulder relief surfaces 126, 130 are arcuate and extend from the front face 54 to the back face 58 of the cutting tip 16. The shoulder relief surfaces 126, 130 also include a shoulder cutting edge. For example, the first shoulder relief surface 126 includes a first shoulder cutting edge 134 on the front face 54, and the second shoulder relief surface 130 includes a second shoulder cutting edge 138 on the back face 58. In some embodiments, the shoulder relief surfaces 126, 130 are omitted, forming a substantially orthogonal transition from the center spur 50 to the shoulders 42, 46.

As discussed above, the shoulders 42, 46 include the main cutting edges 70, 82, the spurs 66, 78, and the side cutting edges 74, 86. The main cutting edges 70, 82 include relief surfaces 142 adjacent the shoulder relief surfaces 126, 130. The relief surface 142 of the first main cutting edge 72 extends from the front face 54 to the back face 58, and the relief surface 142 of the second main cutting edge 82 extends from the back face 58 to the front face 58. The first spur 66 includes a first spur cutting edge 146 and a first side spur cutting edge 150 on the front face 54. Similarly, the second spur 78 includes a second spur cutting edge 154 and a second side spur cutting edge 158 on the back face 58. On the first spur 66, the first spur cutting edge 146 is adjacent the first side cutting edge 74, and the first side spur cutting edge 150 is positioned between the first spur cutting edge 146 and the first main cutting edge 70. On the second spur 78, the second spur cutting edge 154 is adjacent the second side cutting edge 86, and the second side spur cutting edge 158 is positioned between the second spur cutting edge 154 and the second main cutting edge 82. Both the spur cutting edges 146, 154 and the side spur cutting edges 150, 158 include relief surfaces. For example, each of the spur cutting edges 146, 150 includes a spur relief surface 162, and each of the side spur cutting edges 150, 158 includes a side spur relief surface 166. Additionally, the side cutting edges 74, 86 both include outer relief surfaces 170 positioned on the sides of the cutting tip 16.

In the illustrated embodiment, the first upper cutting edge 94, the first lower cutting edge 98, the first shoulder cutting edge 134, the first main cutting edge 70, the first side spur cutting edge 150, the first spur cutting edge 146, and the first side cutting edge 74 form a continuous cutting edge on the front face 54 of the cutting tip 16 that extends from the upper cutting tip 90 to the lower surface 62. Similarly, the second upper cutting edge 102, the second lower cutting edge 106, the second shoulder cutting edge 138, the second main cutting edge 82, the second side spur cutting edge 158, the second spur cutting edge 154, and the second side cutting edge 86 form a continuous cutting edge on the back face 58 of the cutting tip 16 that extends from the upper cutting tip 90 to the lower surface 62.

The front and back continuous cutting edges extend from the upper cutting tip 90 in opposite directions on opposite faces of the cutting tip 16 so that all the cutting edges engage and cut a workpiece when the cutting tip 16 is spun in a clockwise direction. In other embodiments, the cutting edges can be oppositely arranged so that all the cutting edges engage and cut a workpiece when spun in a counter-clockwise direction.

Additionally, all of the relief surfaces are slightly tapered from their respective cutting edges to the opposite face. In other words, the relief surfaces slant from their respective cutting edge to the opposite face from where the cutting edge is positioned. This taper allows for the relief surfaces to increase the life of the cutting tip 16, while decreasing heat cause by the cutting tip 16 rubbing against the workpiece, which may ultimately chip or dull the cutting edges.

As discussed above, the auger bit 10 is meant for use with a rotary tool. The rearward end 26 of the body 18 is received in a chuck of the rotary tool. The rotary tool rotates the auger bit 10. When a user engages the workpiece with the auger bit 10, the upper cutting tip 90 engages the workpiece first so that the center spur 50 creates a pilot hole that the cutting tip 16 can easily follow into. Once the center spur 50 is engaged, the spurs 66, 78 engage the workpiece to drill a hole. Specifically, the center spur 50 and the spurs 66, 78 of the auger bit 10 are configured to drill holes in composite material workpieces, such as composite material utility poles. During drilling, the main cutting edges 70, 82 cut (e.g., break up) material from the workpiece and direct the cut material to the flute 30 of the body 18, leaving the walls of the hole clean. That is, the hole is generally free of burs and other loose fibers after the spurs 66, 78 cut through the composite material workpiece. In addition, walls of the composite material defining the hole do not melt and deform. Once the hole is complete, the user may retract the auger bit 10 from the clean hole.

Accordingly, providing a cutting tip 16 with a center spur 50, two spurs 66, 78, and the continuous cutting edges on the front and back faces 54, 58 allows the auger bit 10 to drill clean holes in composite materials. Additionally, the carbide cutting tip 16 does not melt when using the auger bit 10 to drill holes in composite materials, extending the life and efficiency of the auger bit 10.

Various features and advantages of the invention are set forth in the following claims.

What is claimed is:

1. An auger bit for cutting holes in a composite material utility pole, the auger bit comprising:
    a body made of a first material, the body having a first end, a second end configured to be coupled to a power tool, a flute, and a longitudinal axis extending centrally through the body between the first and second ends; and
    a cutting tip made of a second material different from the first material, the cutting tip coupled to the first end of the body, the cutting tip including
        a first shoulder having a first spur, a first main cutting edge, and a first side cutting edge, the first spur including a first spur cutting edge extending from the first side cutting edge and a first side spur cutting edge extending from the first spur cutting edge to the first main cutting edge, the first side spur cutting edge being angled relative to the first spur cutting edge,
        a second shoulder opposite the first shoulder and having a second spur, a second main cutting edge, and a second side cutting edge, the second spur including a second spur cutting edge extending from the second side cutting edge and a second side spur cutting edge extending from the second spur cutting edge to the second main cutting edge, the second side spur cutting edge being angled relative to the second spur cutting edge, and
        a center spur positioned between the first shoulder and the second shoulder and on the longitudinal axis, the center spur including a first lower cutting edge extending from the first main cutting edge and that is parallel to the longitudinal axis, a first upper cutting edge extending from the first lower cutting edge and that is angled relative to the longitudinal axis, a second lower cutting edge extending from the second main cutting edge and that is parallel to the longitudinal axis, and a second upper cutting edge extending from the second lower cutting edge and that is angled relative to the longitudinal axis,
    wherein the first and second spurs create a clean hole through the composite material utility pole.

2. The auger bit of claim 1, wherein the cutting tip is composed of carbide.

3. The auger bit of claim 1, wherein the body is made of high speed steel, and wherein the cutting tip is made of carbide.

4. The auger bit of claim 1, wherein the body defines a slot at the first end, and wherein the cutting tip is positioned in the slot.

5. The auger bit of claim 1, wherein the first and second shoulders extend in opposite radial directions from the center spur in directions perpendicular to the longitudinal axis.

6. The auger bit of claim 1, wherein the first and second side cutting edges extend axially from the first and second spurs respectfully in a direction substantially parallel to the longitudinal axis.

7. The auger bit of claim 1, wherein the center spur extends axially further than the first and second spurs in a direction parallel to the longitudinal axis.

8. The auger bit of claim 1, wherein the cutting tip further includes a front face, a back face opposite the front face, and a lower surface extending between the front face and the back face, and wherein the center spur includes an upper cutting tip that extends between the front face and the back face.

9. The auger bit of claim 8, wherein the upper cutting tip includes a first upper cutting edge and a first lower cutting edge on the front face, and wherein the upper cutting tip further includes a second upper cutting edge and a second lower cutting edge on the back face.

10. The auger bit of claim 8, wherein the front face defines a first continuous cutting edge that extends from the center spur to the lower surface, and wherein the back face defines a second continuous cutting edge that extends from the center spur to the lower surface.

11. The auger bit of claim 10, wherein the first continuous cutting edge defines a first tapered relief surface that slants from the front face to the back face, and wherein the second continuous edge defines a second tapered relief surface that slants from the back face to the front face.

12. A cutting tip for use with an auger bit for cutting holes in composite material utility poles, the cutting tip comprising:
    a front face;
    a back face opposite the front face;
    a lower surface extending between the front face and the back face;
    a first shoulder having a first spur, a first main cutting edge, and a first side cutting edge;
    a second shoulder opposite the first shoulder and having a second spur, a second main cutting edge, and a second side cutting edge; and
    a center spur positioned between the first shoulder and the second shoulder and on the longitudinal axis,
    wherein the first and second spurs create a clean hole through the composite material utility pole
    wherein the front face defines a first continuous cutting edge that extends from the center spur to the lower surface, and wherein the back face defines a second continuous cutting edge that extends from the center spur to the lower surface;
    wherein the first continuous cutting edge defines a first tapered relief surface that slants from the front face to the back face, the first tapered relief surface positioned along the entire first continuous cutting edge, and wherein the second continuous cutting edge defines a second tapered relief surface that slants from the back face to the front face, the second tapered relief surface positioned along the entire second continuous cutting edge.

13. A method of cutting a hole in a composite material utility pole, the method comprising:
    providing an auger bit according to claim 1;
    rotating the auger bit with a rotary tool; and
    engaging the composite material utility pole with the auger bit to cut a clean hole.

14. The cutting tip of claim 12, wherein the first and second shoulders extend in opposite radial directions from the center spur in directions perpendicular to the longitudinal axis.

15. The cutting tip of claim 12, wherein the center spur extends axially further than the first and second spurs in a direction parallel to the longitudinal axis.

16. The cutting tip of claim 12, wherein the cutting tip is composed of carbide.

* * * * *